US012792010B2

(12) United States Patent
Exner et al.

(10) Patent No.: US 12,792,010 B2
(45) Date of Patent: Nov. 10, 2026

(54) ELECTRONIC DEVICE, A SYSTEM, AND A METHOD FOR ADAPTING A DETECTION MODEL

(71) Applicant: Sony Group Corporation, Tokyo (JP)

(72) Inventors: Peter Exner, Malmö (SE); Hannes Bergkvist, Rydeback (SE)

(73) Assignee: Sony Group Corporation, Tokyo (JP)

( * ) Notice: Subject to any disclaimer, the term of this patent is extended or adjusted under 35 U.S.C. 154(b) by 966 days.

(21) Appl. No.: 17/966,936

(22) Filed: Oct. 17, 2022

(65) Prior Publication Data

US 2023/0138807 A1 May 4, 2023

(30) Foreign Application Priority Data

Nov. 2, 2021 (SE) .................................... 2151346-0

(51) Int. Cl.
*G05B 19/4155* (2006.01)
*G16Y 40/10* (2020.01)

(52) U.S. Cl.
CPC .................... *G05B 19/4155* (2013.01); *G05B 2219/25011* (2013.01); *G16Y 40/10* (2020.01)

(58) Field of Classification Search
CPC .................................................. G05B 19/4155
USPC ............................................................ 706/12
See application file for complete search history.

(56) References Cited

U.S. PATENT DOCUMENTS

2007/0208837 A1* 9/2007 Tian ...................... G06F 3/1232 709/223
2008/0065354 A1* 3/2008 Yoshioka ............ G01M 13/045 702/183
2008/0238720 A1 10/2008 Lee
2015/0006633 A1* 1/2015 Vandwalle .......... H04L 67/1051 709/204

(Continued)

FOREIGN PATENT DOCUMENTS

CN 110599503 B 5/2021
CN 113537517 A 10/2021

(Continued)

OTHER PUBLICATIONS

Office Action and Search Report from corresponding Swedish Application No. 2151346-0, mailed on Jun. 8, 2022, 8 pages.

(Continued)

*Primary Examiner* — Baoquoc N To
(74) *Attorney, Agent, or Firm* — Tucker Ellis LLP

(57) ABSTRACT

An electronic device is configured to obtain first data. The electronic device is configured to determine a first cluster of one or more electronic devices. The electronic device is configured to determine a first configuration parameter. The electronic device is configured to transmit the first detection model to the one or more electronic devices of the first cluster. The electronic device is configured to determine a second cluster of electronic devices. The electronic device is configured to obtain detection data obtained by one or more electronic devices of the second cluster by applying the first detection model. The electronic device is configured to (Continued)

determine a performance parameter of the first detection model. The electronic device is configured to determine a second configuration parameter for the first detection model. The electronic device is configured to transmit the updated first detection model.

16 Claims, 4 Drawing Sheets

(56) References Cited

U.S. PATENT DOCUMENTS

| | | | | |
|---|---|---|---|---|
| 2015/0312113 | A1 | 10/2015 | Forutanpour | |
| 2016/0277815 | A1 | 9/2016 | Yang | |
| 2018/0198680 | A1 | 7/2018 | Mladin | |
| 2019/0141604 | A1 | 5/2019 | Sarangi | |
| 2020/0019842 | A1 * | 1/2020 | Kim | G06N 3/045 |
| 2020/0219015 | A1 | 7/2020 | Lee | |
| 2020/0272859 | A1 | 8/2020 | Iashyn | |
| 2021/0225530 | A1 | 7/2021 | Egi | |

FOREIGN PATENT DOCUMENTS

| | | | |
|---|---|---|---|
| EP | 3026944 | A | 6/2016 |
| WO | WO-2021126019 | A | 6/2021 |

OTHER PUBLICATIONS

Martin Rapp et al., “Distributed Learning on Heterogeneous Resource-Constrained Devices”, arXiv preprint arXiv:2006.05403, Jun. 9, 2020, 14 pages.

* cited by examiner

ELECTRONIC DEVICE, A SYSTEM, AND A METHOD FOR ADAPTING A DETECTION MODEL

CROSS REFERENCE TO RELATED APPLICATIONS

The present application claims priority to Swedish Patent Application No. 2151346-0, filed Nov. 2, 2021, the content of which is incorporated herein by reference in its entirety.

TECHNICAL FIELD

The present disclosure pertains to the field of Internet of things (IoT) and detection devices, and relates to an electronic device and to a method for adapting a detection model.

BACKGROUND

Today, in building management, there is an increase in the use of internet of things devices (IoT devices) for enabling smart buildings. A building or group of buildings can include hundreds of IoT devices (such as smart television, TVs, smart speakers, dedicated connected sensors such as temperature sensors, cameras, microphones, etc.) with a wide range of specifications. Many of the desired features for smart buildings require combining these devices and their sensors with machine learning (ML), and in many cases, the machine learning inference needs to run on the IoT device. Managing a large number of IoT devices and their software in general, and ML models in particular, may be a complex task with many challenges.

SUMMARY

Flexible IoT device application environments for remote and/or over-the-air application update of devices may be used. For example, software, such as applications, may be deployed to IoT devices and not necessarily the whole firmware.

Environments as disclosed herein may act as a software layer separating applications and platform firmware, making applications hardware agnostic. Dynamic deployment may therefore be enabled for both applications and ML models, such as from a cloud.

A remaining challenge of deploying ML models is, for example, how to provide a ML model that performs optimally given the device capability, nearby devices, and/or the environment the device is located in (such as sitting in). It may be envisaged to provide a generic model, that is known to fit the IoT device capabilities. However, by using a generic model not tailored to the environment, the ML model may underperform.

Another challenge of providing a generic model, may be that it may not leverage the capabilities of nearby devices.

Accordingly, there is a need for electronic devices and methods for adapting a detection model (such as a ML model) which may mitigate, alleviate, or address the shortcomings existing and may provide deployment of a detection model which may be adapted (such as tailored) to an electronic device (such as IoT device). A detection model may be adapted to an environment of an electronic device (such as IoT device).

An electronic device is provided. The electronic device comprises memory circuitry, processor circuitry, and interface circuitry. The electronic device is configured to obtain first data comprising a plurality of electronic device identifiers and a plurality of capability parameters comprising for each electronic device a capability parameter indicative of a capability of a corresponding electronic device of the plurality of electronic devices. The electronic device is configured to determine, based on the plurality of capability parameters, a first cluster of one or more electronic devices. The electronic device is configured to determine, based on the capability parameter of each of the one or more electronic devices of the first cluster, a first configuration parameter for obtaining a first detection model to be applied by one or more electronic devices of the first cluster. The electronic device is configured to transmit the first detection model to the one or more electronic devices of the first cluster. The electronic device is configured to determine, based on a proximity parameter, a second cluster of electronic devices. Optionally, the electronic device is configured to obtain, from the second cluster, detection data obtained by one or more electronic devices of the second cluster by applying the first detection model. The electronic device is configured to determine, optionally based on the detection data, a performance parameter of the first detection model when running on an electronic device of the second cluster. The electronic device is configured to determine, based on the performance parameter, a second configuration parameter for the first detection model to provide an updated first detection model. The electronic device is configured to transmit the updated first detection model to one or more electronic devices of the second cluster.

Further a method performed by an electronic device is disclosed. The method comprises obtaining first data comprising a plurality of electronic device identifiers and a plurality of capability parameters comprising for each electronic device a capability parameter indicative of a capability of a corresponding electronic device of the plurality of electronic devices. The method comprises determining, based on the plurality of capability parameters, a first cluster of one or more electronic devices. The method comprises determining, based on the capability parameter of each of the one or more electronic devices of the first cluster, a first configuration parameter for obtaining a first detection model to be applied by one or more electronic devices of the first cluster. The method comprises transmitting the first detection model to the one or more electronic devices of the first cluster. The method comprises determining, based on a proximity parameter, a second cluster of electronic devices. The method comprises obtaining, from the second cluster, detection data obtained by one or more electronic devices of the second cluster by applying the first detection model. The method comprises determining, based on the detection data, a performance parameter of the first detection model when running on an electronic device of the second cluster. The method comprises determining, based on the performance parameter, a second configuration parameter for the first detection model to provide an updated first detection model. The method comprises transmitting the updated first detection model to one or more electronic devices of the second cluster.

Further, a system is disclosed herein, the system comprising an electronic device as disclosed herein and one or more electronic devices (such as IoT devices) of a cluster as disclosed herein.

The disclosed electronic device, related method, and system may provide an improved adaption of a detection model (such as a ML model) and an improved transmittal (such as deployment and/or distribution) of a detection model which may be adapted (such as tailored) to an electronic device (such as IoT device). The present disclosure may provide an adaption of a detection model based on a capability and/or a performance of one or more electronic devices (such as a cluster of electronic devices). Further, the present disclosure may provide a detection model which may be adapted to an environment of an electronic device (such as IoT device). In other words, the present disclosure may provide an improved capacity usage of a detection model when applied by one or more electronic devices.

It may be appreciated that the present disclosure may provide the possibility to maintain a performance (such as a detection performance) of an electronic device when running a detection model. For example, the present disclosure may provide the possibility to maintain a performance (such as a detection performance) of an electronic device when running a detection model. For example for a prioritized detection task (such as detection classes), even with significant reduction of a detection model size (such as ML model size).

Further, the present disclosure may enable cooperation with other electronic devices (such as IoT devices) with other electronic devices (such as IoT devices), for example for collaborating on solving a ML task. For example, an electronic device may only have the capability of detecting a single keyword, item, object, and/or face, but several electronic devices may be capable of collaborating for detecting more keywords, items, objects, and/or faces. For example, a single electronic device may have a small vocabulary of detectable keywords, but several devices in one location may cooperate to detect a larger set of keywords, for example a complete sentence, such as by adapting a detection model, for example by distributing the keywords amongst the electronic devices.

Further, an advantage of the present disclosure may be that when a detection model is under-performing (such as having over-capacity) when applied by one or more electronic devices, an overlap of detection between one or more electronic devices and/or a prioritizing of a detection type may be applied. For example, the present disclosure may allow overlapping of detection of certain detection classes and/or enabling voting (such as prioritizing) between one or more electronic devices. For example, a most confident detection may be prioritized (such as selected) among the detections performed by one or more electronic devices.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
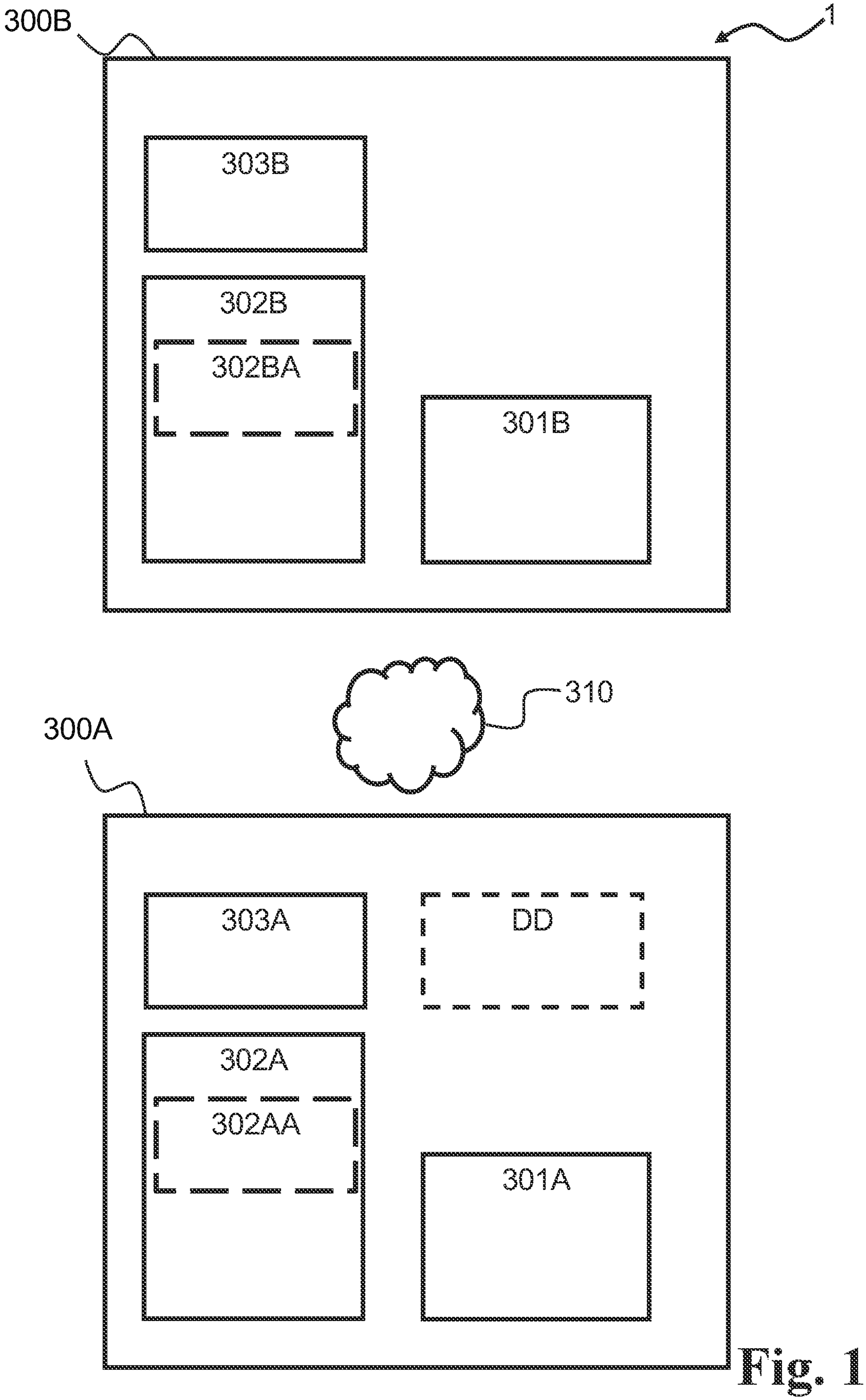
FIG. 1 is a block diagram illustrating an example electronic device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 shows an example system 1 comprising an electronic device 300B according to the disclosure acting as a server device and an electronic device 300A according to the disclosure acting as an electronic device, such as an IoT device.

FIG. 1 shows a block diagram illustrating an electronic device 300B according to the disclosure acting as a server device and a block diagram illustrating an electronic device 300A according to the disclosure acting as an electronic device, such as an IoT device.

The electronic device 300A acting as an electronic device (such as an IoT device) may be configured to communicate with the electronic device 300B acting as a server device via a network 310 (such as an external network, for example a wired communication system and/or a wireless communication system).

In one or more example electronic devices, the electronic device 300B is a server device, such as acting as a server device.

The electronic device 300A, 300B comprises memory circuitry 301A, 301B, interface circuitry 303A, 303B, and processor circuitry 302A, 302B. Optionally, the processor circuitry 302A comprises inference circuitry 302AA configured to run, execute, and/or operate according to a detection model, such as a first detection model, an updated detection model, a second detection model, and/or a third detection model. Optionally, the processor circuitry 302B comprises inference circuitry 302BA configured to run, execute, and/or operate according to a detection model, such as a first detection model, an updated detection model, a second detection model, and/or a third detection model. Optionally, the electronic device 300A, 300B may be part of the plurality of electronic devices (such as IoT devices). In other words, the electronic device 300A, 300B may act as a master device for the remaining electronic devices (such as IoT devices) acting as slaves. Optionally, there may be more than one master electronic device, such as a system comprising a plurality of electronic devices 300A, 300B.

Figure 2A:
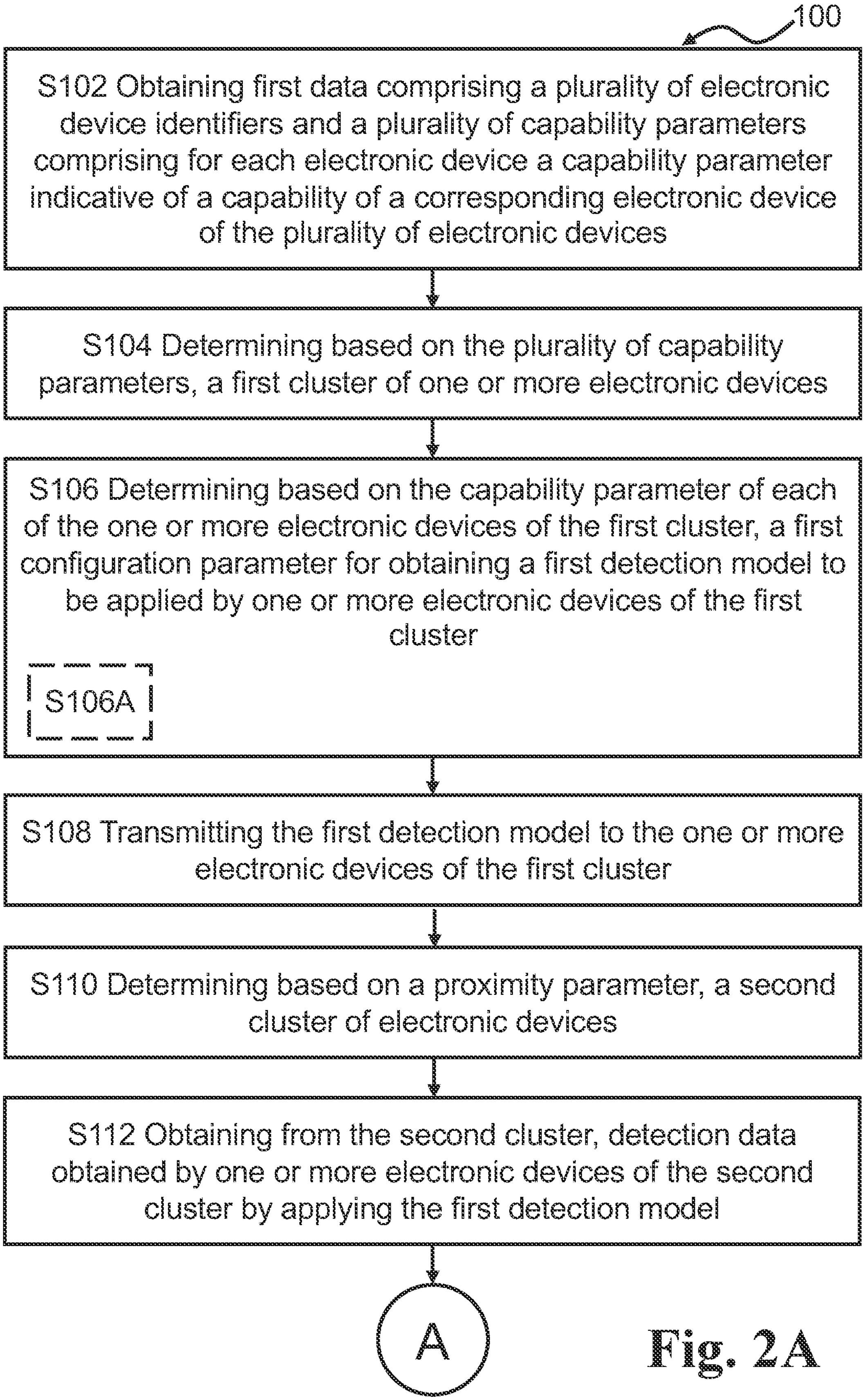
FIGS. 2A-2C are a flow-chart illustrating an example method performed in an electronic device according to this disclosure.
Figure 2B:
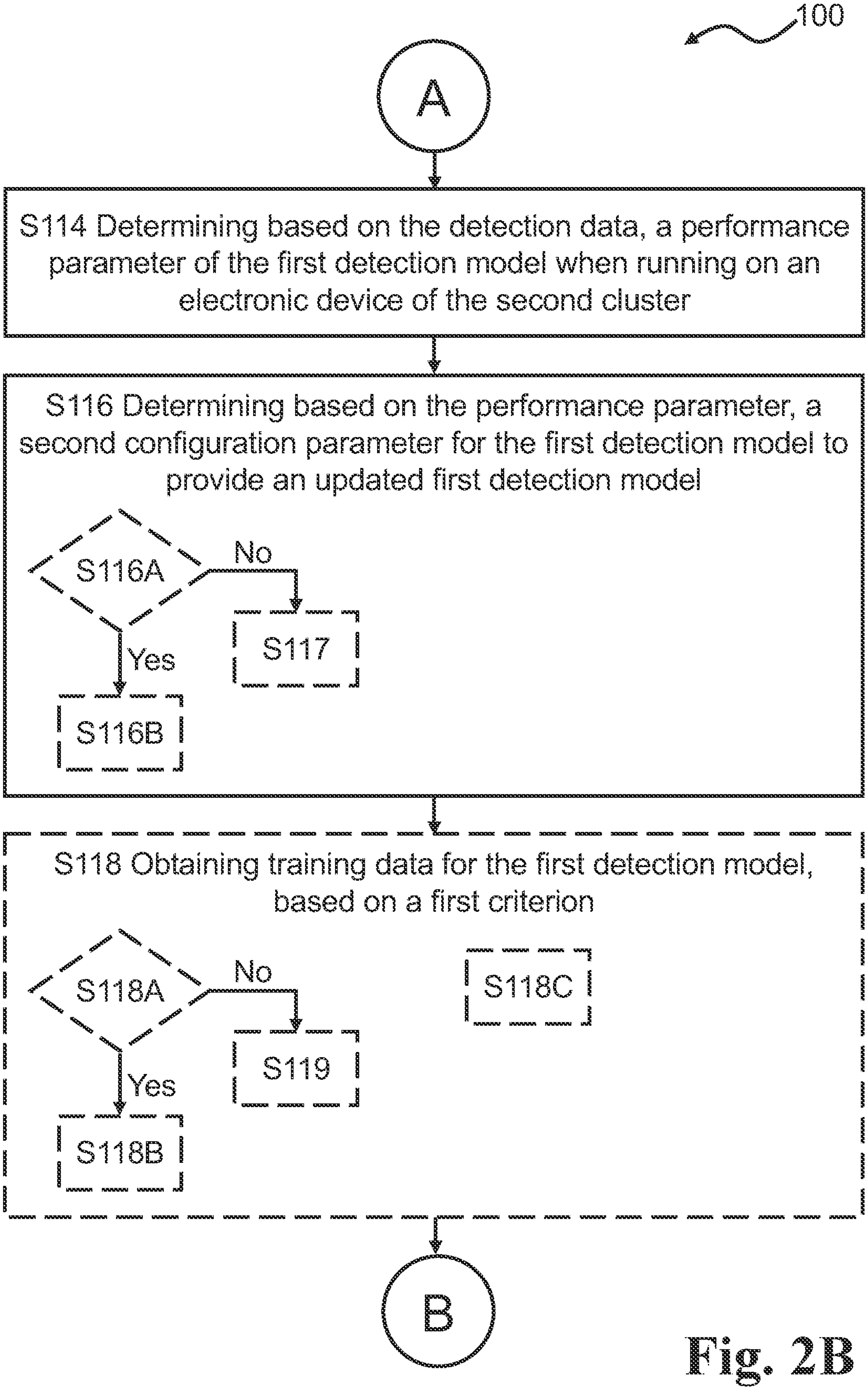
Figure 2C:
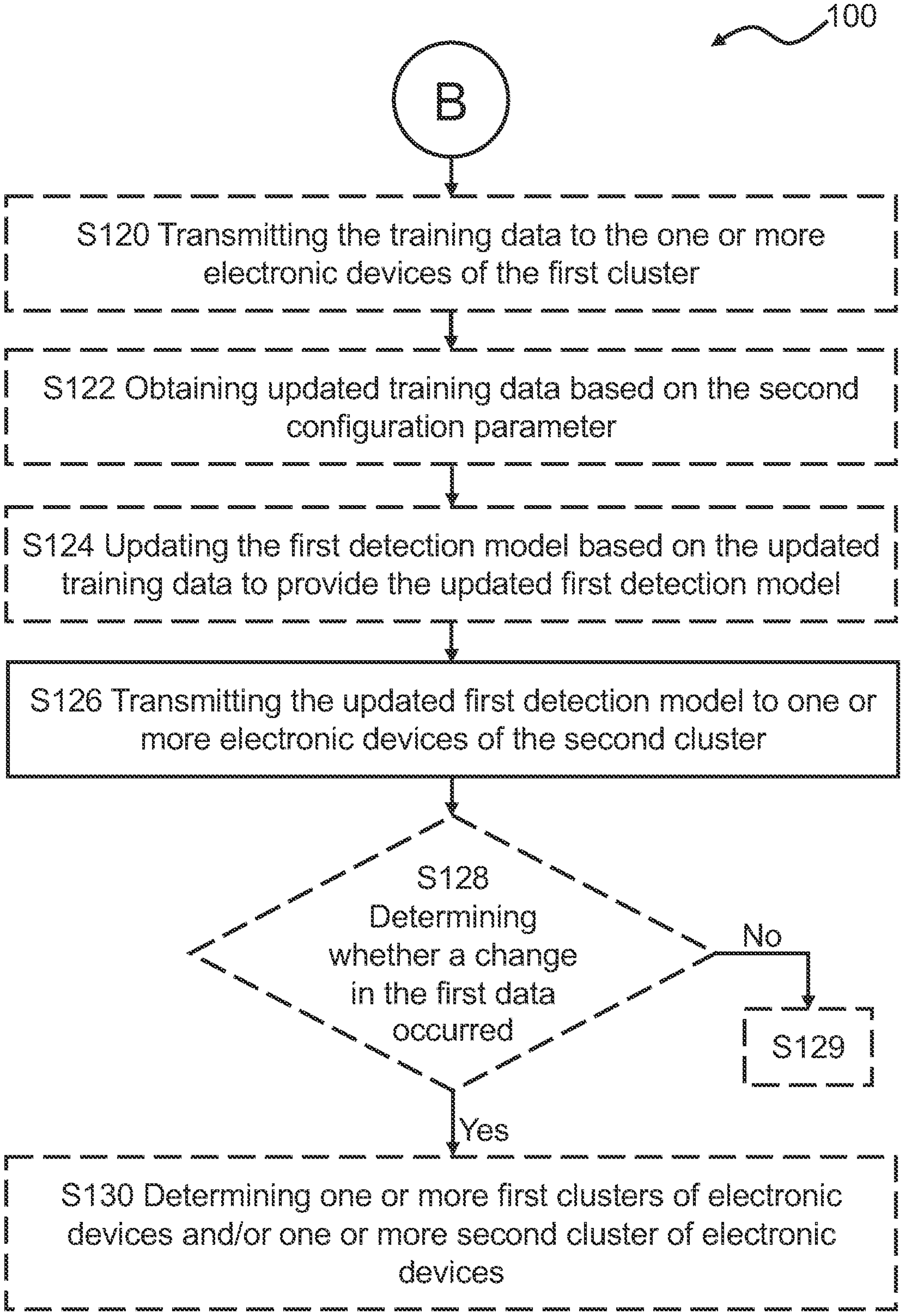

The electronic device 300A, 300B may be configured to perform any of the methods disclosed in FIGS. 2A, 2B, and 2C. In other words, the electronic device 300A, 300B may be configured for adapting a detection model and/or supporting collaboration between electronic devices (such as IoT devices), such as detection collaboration between electronic devices (such as IoT devices). In other words, the electronic device 300A, 300B may be configured for adapting of one or more detection models to one or more electronic devices (such as IoT devices).

The technique disclosed in the present disclosure may for example be applied in the context of urban planning, hospitals, counting people, identify people and/or objects (such as equipment), and grocery stores (such as detecting groceries that are picked, for example to monitor a stock of items such as groceries).

The electronic device 300A, such as the processor circuitry 302A, may for example comprise one or more of an inference device 302AA, a detection device DD (such as one or more of an optical device, a microphone, and a temperature sensor), a portable electronic device, a wireless device, a wired device, and/or an IoT device.

The electronic device 300A, 300B is configured to obtain (such as using the processor circuitry 302A, 302B and/or via the interface circuitry 303A, 303B) first data comprising a plurality of electronic device identifiers. The obtaining of first data may comprise to obtain first data from a plurality of electronic devices, such as a plurality of IoT devices in communication with the electronic device 300A, 300B. In one or more example electronic devices, the electronic device 300A, 300B, may comprise to scan for electronic devices (such as IoT devices), such as to determine one or more electronic devices that the electronic device 300A, 300B may communicate with. To obtain, such as from a plurality of electronic devices, first data may for example comprise to retrieve, to receive, to determine, and/or to select first data, such as electronic device identifiers and/or capability parameters. The plurality of electronic devices (such as IoT devices) may for example comprise one or more of: an optical device, such as a video and/or image detection device, and a sound detection device. The plurality of electronic devices (such as IoT devices) may for example comprise a plurality of cameras and/or microphones in a building, such as in a plurality of rooms of a building. The plurality of electronic devices (such as IoT devices) may for example comprise one or more of: an image sensor, a capturing device, a wall-mounted camera, a web-cam, a closed circuit television, CCTV, an infrared sensor, a light sensor, and an optical movement sensor. The plurality of electronic devices may for example be used in the context of building management, such as smart buildings, for performing detection tasks.

An electronic device identifier may be seen as an identifier comprising information indicative of an electronic device, such as indicative of an identity of an electronic device. Each electronic device may comprise and/or be identified with an electronic device identifier. The obtaining of first data comprising a plurality of electronic device identifiers may comprise to obtain a data set comprising a plurality of electronic device identifiers, such as a data set comprising an electronic device identifier for each electronic device, for example a list of electronic device identifiers.

The first data may comprise a plurality of capability parameters. The plurality of capability parameter may comprise for each electronic device a capability parameter indicative of a capability of a corresponding electronic device of the plurality of electronic devices. The capability parameter may be seen as a capability of an electronic device, such as a capability of an IoT device. For example, the capability parameter may comprise information indicative of whether an electronic device comprises certain capabilities. For example, the capability parameter may comprise information indicative of a resource capability of an electronic device. Each electronic device may comprise and/or be indicative of an electronic device capability. The obtaining of first data comprising a plurality of capability parameters may comprise to obtain a data set comprising a plurality of capability parameters, such as a data set comprising a capability parameter for each electronic device, for example a list of capability parameters for the plurality of electronic devices.

The electronic device 300A, 300B and/or the plurality of electronic devices (such as IoT devices) may be seen as a system for adaption of a detection model for electronic devices (such as clusters of electronic devices), and/or a system for electronic device (such as IoT device) collaboration, such as an IoT device collaboration system. The system may optionally comprise a network node (such as a base station, not shown) that the electronic device 300B acting as server device and the electronic device 300A and/or the electronic devices (such as IoT devices) may communicate through. A network node refers to an access point and/or radio access network node operating in the radio access network, such as a base station, an evolved Node B, eNB, gNB in NR. In one or more examples, the RAN node is a functional unit which may be distributed in several physical units.

The electronic device 300A, 300B and the electronic devices may use, such as via the interface circuitry 303A, 303B, a cellular system, for example, a 3GPP wireless communication system and/or the internet, and/or a local communication system, such as short-range wireless communications systems, such as Wi-Fi, Bluetooth, Zigbee, IEEE 802.11, IEEE 802.15 to communicate. The electronic device 300B acting as server device may be seen as a device configured to act as a server in communication with a client device, where the electronic device 300A and/or the electronic devices are configured to act as a clients.

In one or more example electronic devices, the capability parameter comprises one or more of: a memory capability parameter, a processing capability parameter, a hardware capability parameter, a software capability parameter, and a battery capability parameter. In other words, the capability parameter may be seen as one or more of: a memory capability parameter, a processing capability parameter, a hardware capability parameter, a software capability parameter, and a battery capability parameter. A capability parameter as disclosed herein may be seen as a condition for clustering the plurality of electronic devices.

A memory capability parameter may be seen as comprising information indicative of a memory capability of an electronic device, such as a type of memory and/or a storage capability of an electronic device. A processing capability parameter may be seen as comprising information indicative of a processing capability of an electronic device, such as a type of processing circuitry and/or a processing resource of an electronic device.

A hardware capability parameter may be seen as comprising information indicative of a hardware capability of an electronic device, such as a type of hardware that an electronic device comprises. A hardware capability may comprise information indicating whether an electronic device comprises a sensor, such as an optical sensor (such as a camera), a temperature sensor, a wireless sensor, and/or a microphone.

A software capability parameter may be seen as comprising information indicative of a software capability of an electronic device, such as a type of software that an electronic device comprises and/or is supporting. A software capability may comprise information indicating whether an electronic device supports and/or comprises certain software, supports an architecture (such as a ML model architecture), and/or supports a model (such as a detection model). In one or more example electronic devices, the capability parameter comprises an availability parameter indicative of an availability of the capabilities of an electronic device. For example, the capability parameter comprises an availability parameter indicative of whether the capabilities of an electronic device are available or not, such as for which time period the capabilities are available and/or which capabilities are available. In one or more example electronic devices, the capability parameter comprises a connectivity capability parameter indicative of a connectivity of an electronic device. In one or more example electronic devices, the capability parameter comprises a reliability parameter indicative of a reliability of an electronic device.

A battery capability parameter may be seen as comprising information indicative of a battery capability of an electronic device, such as a type of battery and/or a battery capacity capability of an electronic device. A battery capability may comprise information indicating whether an electronic device comprises a battery or not, such as information indicating a type of power supply of an electronic device.

The electronic device 300A, 300B is configured to determine (such as using the processor circuitry 302A, 302B), based on the plurality of capability parameters, a first cluster of one or more electronic devices. In one or more example electronic devices, the electronic device 300A, 300B may be configured to determine (such as using the processor circuitry 302A, 302B), based on the plurality of capability parameters (such as some of the plurality of capability parameters) and/or the plurality of electronic device identifiers (such as some of the plurality of electronic device identifiers), a first cluster of one or more electronic devices. In one or more example electronic devices, the electronic device 300A, 300B may be configured to determine, based on the plurality of capability parameters and/or the plurality of electronic device identifiers, a plurality of clusters, such as a plurality of first clusters, for example including a first primary cluster, a first secondary cluster, and/or a first tertiary cluster.

A cluster as disclosed herein, such as the first cluster and/or the second cluster, may be seen as a group of devices, such as a group of electronic devices. A group of electronic devices may comprise at least one electronic device. In other words, a cluster as disclosed herein, such as the first cluster and/or the second cluster, may be seen as a group of devices being configured to run and/or execute the same or a similar detection model, such as sharing a similar detection model configuration. In other words, a cluster as disclosed herein, such as the first cluster and/or the second cluster, may be seen as comprising a group of electronic devices, such as a group of electronic device being brought together in a cluster based the plurality of capability parameters.

The determination of the first cluster based on the plurality of capability parameters may comprise to determine one or more electronic devices having similar capability parameters and/or having complementary capability parameters. For example, the first cluster may comprise one or more electronic devices having similar and/or complementary memory capability parameter, processing capability parameter, hardware capability parameter, software capability parameter, and/or a battery capability parameter. In other words, the first cluster may comprise one or more electronic devices supporting similar and/or complementary architectures and/or detection models. For example, the first cluster may comprise electronic devices being able to run and/or execute the same type of detection model(s) but having different processing capabilities. The determination of the first cluster may comprise to determine a first cluster comprising electronic devices having complementary capability parameters. In other words, the determination of the first cluster may comprise to determine a first cluster based on a trade-off between detection speed (such as inference speed, for example based on processing capabilities) and detection accuracy (such as detection range, for example based on processing capabilities). For example, electronic devices may differ on certain capabilities, such as when a capability is not crucial for a detection task. Even when an electronic device has a lower capability than another electronic device in the first cluster, the electronic device may still be able to perform enough detections to perform a detection task.

A cluster as disclosed herein, such as the first cluster and/or the second cluster, may be seen as a data set comprising one or more electronic device identifiers belonging to the same cluster, and optionally for each electronic device an associated capability parameter. In one or more example electronic devices, the electronic device 300A, 300B may be configured to determine whether a capability parameter satisfies a capability criterion. In accordance with the capability parameter satisfying the capability criterion, the electronic device 300A, 300B may be configured to determine the first cluster of one or more electronic devices according to the capability criterion. For example, the electronic device 300A, 300B may be configured to cluster one or more electronic devices having similar and/or complementary capability parameters. The capability criterion may comprise a capability threshold. The capability parameter may satisfy the capability criterion when the capability parameter is above or equal to the capability threshold.

The electronic device 300A, 300B is configured to determine (such as using the processor circuitry 302A, 302B), based on the capability parameter of each (such as some of) of the one or more electronic devices of the first cluster, a first configuration parameter for obtaining a first detection model to be applied by one or more electronic devices of the first cluster. The determination of the first configuration parameter may comprise to determine a configuration for obtaining the first detection model to be applied by one or more electronic devices of the first cluster. In other words, the first detection model may be obtained, such as determined, selected, retrieved, and/or received based on the first configuration parameter. In one or more example electronic devices, the electronic device 300A, 300B may be configured to determine the first configuration parameter based on one or more of: a memory capability parameter, a processing capability parameter, a hardware capability parameter, a software capability parameter, and a battery capability parameter. In other words, the determination of the first configuration parameter comprises to determine one or more parameters of a detection model that the electronic devices of the first cluster may be able to (such as estimated to) run and/or execute based on the capability parameters of the electronic devices of the first cluster.

A detection model as disclosed herein, such as the first detection model, may be seen as a model, such as a machine learning (ML) model and/or an inference model for detecting one or more items. Detecting one or more items may comprise the detection (recognition and/or identification) of objects, detection (recognition and/or identification) of keywords, detection (recognition and/or identification) of faces, detection (recognition and/or identification) of poses, detection of activity, and/or tracking of one or more subjects and/or objects. A detection model as disclosed herein, may be seen as an item detector, such as an object detector, a face detector, a keyword detector, a pose detector, an activity detector, and/or a subject tracker.

A detection model as referred to herein (such as the first detection model and/or updated first detection model) may be seen as a model and/or a scheme and/or a mechanism and/or a method configured to provide, based on operational data and/or detection data. A detection model as referred to herein may comprise one or more of: a support-vector machine, SVM, model, a random forest, RF, model, a lightweight convolutional neural network, CNN, model (such as MobileNet and/or CondenseNet), recurrent neural network, RNN, (such as LightRNN and/or FastGRNN). Operational data and/or detection data may be seen as sensor data obtained by one or more electronic device (such as IoT device), such as by one or more sensors of an electronic device, one or more detections of one or more items, such as of a keyword, an object, an activity, and/or a face.

In one or more example electronic devices, a detection model as referred to herein may be stored on a non-transitory storage medium (for example, memory circuitry 301A, 300B) and/or a non-transitory storage medium of an electronic device. A detection model may be stored on a non-transitory storage medium of the electronic device 300A, 300B and/or of an electronic device being configured to execute the model. In one or more example electronic devices, a detection model may comprise detection model data and or computer readable instructions (for example based on operational data and/or detection data, such as sensor data obtained by a sensor of an electronic device, and/or such as historical operational data, such as historical sensor data obtained by a sensor of an electronic device). The detection model data and/or the computer readable instructions may be used by the electronic device 300A, 300B and/or the electronic devices. A detection model (such as detection model data and/or the computer readable instructions) may be used by the electronic device 300A, 300B and/or the electronic devices to detect, identify, and/or track an item and/or a subject. In other words, a detection model may comprise pre-stored detection model data indicative of one or more items, activities, and/or subjects to identify. The electronic device 300A, 300B and/or the electronic devices may be configured to determine, based a detection model (which comprises the detection model data) one or more of an item, a keyword, an object, an activity, a face, and/or subject by running an inference based on the detection model, such as the first detection model and/or the updated first detection model. A configuration parameter as disclosed herein may comprise one or more of: a number of parameters of a detection model, data to load in a detection model, a range of input of a detection model, and an output of a detection model.

In one or more example electronic devices, the first detection model is configured to detect one or more of: a keyword, an item, an object, and a face. An item may be seen as any one or more of a keyword, an object, and face.

For example, a keyword may be seen as a voice utterance, a voice discourse, a speech utterance, a spoken word, a query, and/or a speech discourse from one or more subjects that may be detected by the first detection model. A keyword may be indicative of one or more pre-determined sounds, such as one or more pre-determined words, such as one or more pre-determined sentences that may be detected by the first detection model.

For example, the object may be seen as an item generally classified as an object and/or a shape of an item (such as a part of an object, an object of a specific shape). In other words, the object may be denoted as a feature. For example, a feature that the first detection model may be able to detect, such as trained to detect, can be, for example, a shape. For example, the object may comprise an object such as an object of a building, such as representative of an object in a meeting room, such as furniture, for example a chair and/or a table. The object may comprise a specific type of object, such as a specific type of furniture object (such as representative of a specific chair).

For example, a face may refer to an item generally classified as a face and/or a shape of a face (such as a part of a face of a subject representing a face, a specific face of a subject, such as a face a certain gender and/or a face of a specific person). In other words, the face may be denoted as a feature, for example a feature that the third detection model may be able to detect, such as trained to detect. For example, the face may comprise a human face and/or a subject face. A face may be detected by detecting a subject's face key points, such as face reference points.

In one or more example electronic devices, the determination of the first configuration parameter of the first detection model comprises to determine one or more of: a model size, a model architecture, and a complexity level of the first detection model. In other words, the determination of the first configuration parameter of the first detection model is based on the determination of one or more of: a model size, a model architecture, and a complexity level of the first detection model.

A model size may be seen as one or more of: a number of parameters of a detection model, data to load in a detection model, a range of input of a detection model, and an output of a detection model. A model architecture may be seen as an architecture of a detection model. For example, a model architecture may comprise a model architecture that an electronic device is configured to support. A model architecture may for example comprise one or more of: a portable electronic device model architecture and a graphics processing unit architecture. A model architecture may comprise a type of layers to use. For example, not all types of layers may be supported by all electronic devices.

A complexity level of a detection model may be indicative of a complexity level of the first detection model, such as a complexity level that the electronic devices of the first cluster may be configured to run and/or execute. The first configuration parameter may be seen as indicating how to adapt (such as how to configure) the first detection model in such a way that it matches the capability parameters of the electronic devices of the first cluster. In other words, the first configuration parameter may be seen as indicating how to adapt (such as how to configure) the first detection model in such a way that the electronic devices of the first cluster may perform a detection task.

The electronic device 300A, 300B is configured to transmit (such as using the processor circuitry 302A, 302B and/or via the interface circuitry 303A, 303B) the first detection model to the one or more electronic devices of the first cluster. In other words, the electronic device 300A, 300B may be configured to distribute (such as assign) the first detection model to the one or more electronic devices of the first cluster.

The electronic device 300A, 300B is configured to determine (such as using the processor circuitry 302A, 302B), based on a proximity parameter, a second cluster of electronic devices. The determination of the second cluster of electronic devices may comprise to determine, select, retrieve, and/or obtain, the electronic devices of the first cluster to be in the second cluster. In one or more example electronic devices, each electronic device, such as each electronic device of the first cluster, may comprise a proximity parameter (such as vicinity parameter). In other words, the first data may comprise one or more proximity parameters, such as a plurality of proximity parameters. In one or more example electronic devices, the electronic device 300A, 300B may be configured to determine, based on the one or more proximity parameters of the one or more electronic devices of the first cluster, the second cluster of electronic devices. Optionally, the determination of the second cluster of electronic devices may comprise to determine, select, retrieve, and/or obtain, the electronic devices of one or more clusters, such as including the first cluster, to be in the second cluster. In other words, electronic devices from different clusters, formed during the first clustering, could be selected into the same cluster during the second clustering. The electronic devices in the second cluster may then have different and/or complementing capabilities.

In one or more example electronic devices, the electronic device 300A, 300B may be configured to determine whether a proximity parameter satisfies a proximity criterion. In accordance with the proximity parameter satisfying the proximity criterion, the electronic device 300A, 300B may be configured to determine the second cluster of electronic devices. Each electronic device, such as each electronic device of the first cluster, may have an associated proximity parameter. The proximity criterion may comprise a proximity threshold. The proximity parameter may satisfy the proximity criterion when the proximity parameter is below or equal to the proximity threshold. In one or more example electronic devices, the electronic device 300A, 300B may be configured to determine, based on the proximity parameter, a plurality of clusters, such as a plurality of second clusters, for example including a second primary cluster, a second secondary cluster, and/or a second tertiary cluster. In one or more example electronic devices, the electronic device 300A, 300B may be configured to obtain detection data, such as first detection data, obtained by one or more electronic devices of the first cluster by applying the first detection model. In one or more example electronic devices, the electronic device 300A, 300B may be configured to determine the proximity parameter based on the detection, such as the first detection data.

In one or more example electronic devices, the proximity parameter comprises one or more of: a positioning parameter, a contextual location parameter, an audial context parameter, a video context parameter, a radio context parameter, and a connectivity parameter. In other words, proximity parameter may be seen as indicative of a position, such as a relative position of electronic devices, indicative of an audial context of electronic devices, indicative of a video context of electronic devices, indicative of a radio context of electronic devices, and/or indicative of a connectivity of electronic devices.

A position parameter may be seen as a distance between the positions of two or more electronic devices, such as two or more electronic devices of the first cluster and/or the second cluster. For example, a position parameter may be seen as a distance between the positions of the electronic device 300A, 300B and a second electronic device. For example, a position parameter may be seen as a distance between the positions of a first electronic device of the plurality of electronic devices and a second electronic device of the plurality of electronic devices. Each electronic device, such as each electronic device of the first cluster, may have an associated position parameter indicative of a position of the respective electronic devices. In other words, a position parameter may comprise location data, such as global positioning data, GPS, indicative of a location of an electronic device. For example, the electronic device 300A, 300B may determine whether the position parameters of two or more electronic devices satisfy the proximity criterion. In other words, the electronic device 300A, 300B may determine whether the positions of two or more electronic devices are proximal to each other, such as at the same or similar position.

A contextual location parameter may be seen as a parameter indicative of a contextual location of an electronic device. For example, a contextual location parameter may comprise a position label, such as indicative of a room and/or a building where the electronic device is located. For example, the electronic device 300A, 300B may determine whether the contextual location parameters of two or more electronic devices satisfy the proximity criterion. In other words, the electronic device 300A, 300B may determine whether the contextual locations of two or more electronic devices are proximal and/or the same, such as in the same or similar room and/or building.

An audial context parameter may be seen as a parameter indicative of an audial context of an electronic device, such as a certain sound captured by an electronic device. In other words, an audial context parameter may comprise sound data indicative of an audial context of an electronic device. For example, an audial context parameter may comprise a captured sound, such as a sound label, for example indicative of a sound captured by the electronic device. For example, the electronic device 300A, 300B may determine whether the audial context parameters of two or more electronic devices satisfy the proximity criterion. In other words, the electronic device 300A, 300B may determine whether the audial contexts of two or more electronic devices are proximal and/or the same, such as the two or more electronic devices capturing the same or similar sound. For example, as audio context parameter may comprise a sound signature of environment, such as a specific sound which is detected. For example, an audio context parameter may comprise a specific fan sound and/or a person talking.

A video context parameter may be seen as a parameter indicative of a video context of an electronic device, such as a certain image and/or image frames captured by an electronic device. In other words, a video context parameter may comprise image data and/or video data indicative of a video context of an electronic device. For example, a video context parameter may comprise a captured image frame(s), such as a field of view, for example comprising a certain item captured by the electronic device, for example by using vision. For example, the electronic device 300A, 300B may determine whether the video context parameters of two or more electronic devices satisfy the proximity criterion. In other words, the electronic device 300A, 300B may determine whether the video contexts of two or more electronic devices are proximal and/or the same, such as the two or more electronic devices capturing the same or similar field of view and/or image frame. In other words, the electronic device 300A, 300B may determine whether the field of view of two or more electronic devices are overlapping. For example, a video context parameter may comprise a vision signature of environment, such as a specific item detected.

A radio context parameter may be seen as a parameter indicative of a radio context and/or radio environment of an electronic device, such as a certain radio parameter sensed by an electronic device. In other words, a radio context parameter may comprise radio data and/or radio wave data indicative of a radio context of an electronic device. For example, a radio context parameter may comprise an LTE radio context sensed by the electronic device. For example, the electronic device 300A, 300B may determine whether the radio context parameters of two or more electronic devices satisfy the proximity criterion. In other words, the electronic device 300A, 300B may determine whether the radio contexts of two or more electronic devices are proximal and/or the same, such as the two or more electronic devices being located in the same or similar radio environment, such as on the same network.

A connectivity parameter may be seen as a parameter indicative of a connectivity context of an electronic device, such as a type of connectivity of an electronic device. In other words, a connectivity parameter may comprise connectivity data indicative of a connectivity context of an electronic device. For example, a connectivity parameter may comprise a connectivity sensed by the electronic device. For example, the electronic device 300A, 300B may determine whether the connectivity parameters of two or more electronic devices satisfy the proximity criterion. In other words, the electronic device 300A, 300B may determine whether the connectivity of two or more electronic devices are proximal and/or the same, such as the two or more electronic devices having the same or similar connectivity, such as on the same network. A connectivity parameter may be seen as a device to device connectivity. For example the connectivity parameter may comprise information indicative of one or more of: Bluetooth low energy, BLE, connectivity, received signal strength indication, RSSI, connectivity, low term evolution, LTE, connectivity, and fingerprint connectivity.

In one or more example electronic devices, the electronic device 300A, 300B is configured to obtain (such as using the processor circuitry 302A, 302B and/or via the interface circuitry 303A, 303B), from the second cluster, detection data obtained by one or more electronic devices of the second cluster by applying the first detection model. Detection data may be seen as data obtained, such as detected, by one or more electronic devices (such as IoT devices) of the second cluster by applying (such as running and/or executing) the first detection model, such as obtained by one or more sensors of the one or more electronic devices.

In one or more example electronic devices, the detection data comprises one or more of: keyword detection data, item detection data, object detection data, proximity parameter data (such as proximity detection data, for example audial proximity data), and face detection data. Detection data may be seen as data detected by one or more electronic devices of the second cluster, such as a video and/or image detection devices, and a sound detection devices when applying the first detection model. In one or more example electronic devices, the electronic device 300A, 300B may be configured to obtain detection data, such as second detection data, obtained by one or more electronic devices of the second cluster by applying the first detection model.

The electronic device 300A, 300B is configured to determine (such as using the processor circuitry 302A, 302B), based on the detection data, a performance parameter of the first detection model when running on an electronic device of the second cluster.

A performance parameter as disclosed herein may be seen as a performance of an electronic device of the second cluster when running a detection model, such as the first detection model. In other words, a performance parameter may be seen as a performance of an electronic device when running the first detection model for a certain detection task, such as a certain sensor input. A performance parameter may comprise a score, such as a confidence score of detection. To determine a performance parameter may comprise to determine a confidence score indicating a confidence and/or a probability that a detection, such as an output of a detection model, is correct. In other words, a performance parameter may comprise a confidence score indicating a confidence and/or a probability that a detection, such as an output of a detection model, is correct. For example, when the first detection model is a keyword detection model, an electronic device running the first detection model may output a performance parameter comprising a confidence score of detection of a keyword, such as a certain keyword. To determine a performance parameter may comprise to determine a performance indicator. In one or more example electronic devices, the performance parameter is indicative of a performance of the first detection model when performing a detection. In other words, the performance parameter as disclosed herein may be seen as a performance of an electronic device of the second cluster when performing a detection, such as running the first detection model.

The electronic device 300A, 300B is configured to determine (such as using the processor circuitry 302A, 302B), based on the performance parameter, a second configuration parameter for the first detection model to provide an updated first detection model. The determination of the second configuration parameter may comprise to determine a configuration for obtaining the updated first detection model to be applied by one or more electronic devices of the second cluster. In other words, the updated first detection model may be obtained, such as determined, selected, retrieved, and/or received based on the second configuration parameter. In one or more example electronic devices, the electronic device 300A, 300B may be configured to determine the second configuration parameter based on the performance parameter. In other words, the determination of the second configuration parameter comprises to determine one or more parameters of a detection model that the electronic devices of the second cluster may be able to (such as estimated to) run and/or execute based on the performance parameter of the electronic devices of the second cluster be applying the first detection model.

The electronic device 300A, 300B is configured to transmit (such as using the processor circuitry 302A, 302B and/or via the interface circuitry 303A, 303B) the updated first detection model to one or more electronic devices of the second cluster. In other words, the electronic device 300A, 300B may be configured to distribute (such as assign and/or apply) the updated first detection model to one or more electronic devices of the second cluster, such as to each of the one or more electronic devices of the second cluster. The electronic device 300A, 300B may be configured to communicate the updated first detection model to one or more electronic devices of the second cluster.

In one or more example electronic devices, the determination of the second configuration parameter comprises to determine whether the performance parameter satisfies a second criterion. The second criterion may be seen as a performance criterion, such as a criterion indicative of a detection performance of the first detection model when applied by an electronic device of the second cluster. In other words, the second criterion may be seen as a capacity criterion, such as a criterion indicative of a capacity usage of the first detection model when applied by an electronic device of the second cluster. The capacity usage may be assessed in view of a plurality of electronic devices of the second cluster. In other words, the determination of whether the performance parameter satisfies the second criterion may comprise to determine whether a capacity usage of the first detection model and/or a capacity usage of one or more electronic devices of the second cluster is satisfied or not. In other words, the electronic device 300A, 300B may determine whether the first detection model is over-performing when applied by one or more electronic devices of the second cluster. When the second criterion is not satisfied, the electronic device 300A, 300B may be configured to determine that the first detection model is under-performing when applied by one or more electronic devices of the second cluster.

In one or more example electronic devices, the second criterion is based on a second threshold. For example, the performance parameter satisfies the second criterion when the performance parameter is below the second threshold.

In one or more example electronic devices, the determination of the second configuration parameter comprises to, when the performance parameter satisfies the second criterion, determine the second configuration parameter comprising an overlap parameter. In other words, in accordance with the performance parameter satisfying the second criterion, the electronic device 300A, 300B may be configured to determine the second configuration parameter comprising an overlap parameter. For example, the electronic device 300A, 300B may determine, when the performance parameter is satisfied, that the first detection model has under-capacity usage when applied by one or more electronic devices of the second cluster. For example, the electronic device 300A, 300B may determine, when the performance parameter is satisfied, that the first detection model has under-capacity usage when applied by one or more electronic devices of the second cluster.

For example, the electronic device 300A, 300B may determine, when the performance parameter is satisfied, that the first detection model is over-performing when applied by one or more electronic devices of the second cluster. In other words, the first detection model may be over-performing when applied by one or more electronic devices of the second cluster in view of the usage capacity of the first detection model and/or the one or more electronic devices of the second cluster. For example, the electronic device 300A, 300B may determine, when the performance parameter is satisfied, that the first detection model is over-performing when applied by one or more electronic devices of the second cluster. In other words, when the performance parameter is satisfied, the usage of the first detection model for performing a detection task when applied by one or more electronic devices of the second cluster may be sub-optimal in comparison with how the usage of the first detection model could be for a detection task. In other words, the first detection model, when applied by one or more electronic devices of the second cluster, could perform a more advanced detection task, such as detecting more detection elements and/or more advanced detection elements.

An overlap parameter as referred to herein may be seen as a parameter indicative of an overlap in detection, such as an overlap in the detection of detection elements (such as items, keywords, objects, faces, and/or subjects). In other words, the overlap parameter may be seen as a parameter defining an overlap in detection or not, such as an overlap in the detection of detection elements (such as items, keywords, objects, faces, and/or subjects), between one or more electronic devices of the second cluster or not. An overlap parameter as referred to herein may be seen as a parameter indicative of an overlap in detection between a plurality of electronic devices.

In one or more example electronic devices, the overlap parameter is configured to prevent overlap of detection elements between the one or more electronic devices of the second cluster and/or to prioritize a first detection type. In other words, in accordance with the performance parameter satisfying the second criterion, the electronic device 300A, 300B may be configured to determine the updated first detection model such as to prevent overlap of detection elements between the one or more electronic devices of the second cluster. To prevent overlap of detection elements between the one or more electronic devices of the second cluster may comprise to prevent overlap in detection of the same detection elements (such as detection of the same items, keywords, objects, faces, and/or subjects) between the electronic devices of the second cluster. For example, to prevent overlap of detection elements between the one or more electronic devices of the second cluster may comprise to prevent overlap in detection of the same keywords between the electronic devices located in the same room, such as the electronic devices capturing substantially the same sounds. To prioritize a first detection type may comprise to prioritize one or more detection elements with respect to other detection elements. For example, to prioritize a first detection type may comprise to prioritize certain keywords and/or faces to be detected. For example, the detection elements that are most frequently used and/or the detection elements for which the first detection model has the lowest performance parameter may be prioritized as the first detection type. In other words, certain detection elements may be prioritized to be detected by fastest, most capable, and/or most reliable electronic device applying the first detection model.

In one or more example electronic devices, the electronic device 300A, 300B is configured to, when the performance parameter does not satisfy the second criterion, determine the second configuration parameter comprising the overlap parameter. In other words, in accordance with the performance parameter not satisfying the second criterion, the electronic device 300A, 300B may be configured to determine the second configuration parameter comprising an overlap parameter. For example, the electronic device 300A, 300B may determine, when the performance parameter is not satisfied, that the first detection model is under-performing when applied by one or more electronic devices of the second cluster. For example, the electronic device 300A, 300B may determine, when the performance parameter is not satisfied, that the first detection model has over-capacity usage when applied by one or more electronic devices of the second cluster. For example, the electronic device 300A, 300B may determine, when the performance parameter is not satisfied, that the first detection model has over-capacity usage when applied by one or more electronic devices of the second cluster.

For example, the electronic device 300A, 300B may determine, when the performance parameter is not satisfied, that the first detection model is under-performing when applied by one or more electronic devices of the second cluster. In other words, the first detection model may be under-performing when applied by one or more electronic devices of the second cluster in view of the usage capacity of the first detection model and/or the one or more electronic devices of the second cluster. For example, the electronic device 300A, 300B may determine, when the performance parameter is not satisfied, that the first detection model is under-performing when applied by one or more electronic devices of the second cluster. In other words, when the performance parameter is not satisfied, the usage of the first detection model for performing a detection task when applied by one or more electronic devices of the second cluster may be too important in comparison with how the usage of the first detection model could be for a detection task. In other words, the first detection model when applied by one or more electronic devices of the second cluster may have a low performance and/or have a low confidence score when detecting detection elements, which may result in detection errors. For example, the electronic device 300A, 300B may, when the performance parameter is not satisfied, determine the updated first detection model having less advanced detection tasks, such as detecting less detection elements and/or more less advanced detection elements, and/or allow overlap of detection between the one or more electronic devices of the second cluster in order to improve the performance parameter of the updated first detection model when applied by one or more electronic devices of the second cluster. In other words, when the performance of a detection model on an electronic device is not as optimal as it could be for solving a specific detection task (such as solving a task by a cluster of electronic devices), the detection model may be adapted for that electronic device and/or cluster of electronic devices, by modifying detection elements and/or overlap of detection elements between electronic devices.

In one or more example electronic devices, the overlap parameter is configured to allow overlap of detection between the one or more electronic devices of the second cluster and/or to prioritize a second detection type. In other words, in accordance with the performance parameter not satisfying the second criterion, the electronic device 300A, 300B may be configured to determine the updated first detection model such as to allow overlap of detection elements between the one or more electronic devices of the second cluster. To allow overlap of detection elements between the one or more electronic devices of the second cluster may comprise to allow overlap in detection of the same detection elements (such as detection of the same items, keywords, objects, faces, and/or subjects) between the electronic devices of the second cluster. For example, to allow overlap of detection elements between the one or more electronic devices of the second cluster may comprise to allow overlap in detection of the same keywords between the electronic devices located in the same room, such as the electronic devices capturing substantially the same sounds. To prioritize a second detection type may comprise to prioritize one or more detection elements with respect to other detection elements. For example, to prioritize a second detection type may comprise to prioritize certain keywords and/or faces to be detected, for example by a plurality of electronic devices of the second cluster. For example, the detection elements that are most frequently used and/or the detection elements for which the first detection model has the lowest performance parameter may prioritized as the second detection type. In other words, certain detection elements may be prioritized to be detected by a plurality of electronic device applying the first detection model. In other words, when the first detection model is under-performing when applied by one or more electronic devices of the second cluster, the allowance of overlap of detection between the one or more electronic devices of the second cluster and/or the prioritizing of a second detection type may comprise to allow overlapping of detection of certain detection classes and/or enabling voting (such as prioritizing) between one or more electronic devices of the second cluster. For example, a most confident detection may be prioritized (such as selected) among the detections performed by the one or more electronic devices of the second cluster.

In one or more example electronic devices, the electronic device 300A, 300B is configured to obtain training data (such as training examples) for the first detection model, based on a first criterion, such as based on the first configuration parameter. The obtaining of the training data may comprise to determine, select, generate, retrieve, and/or obtain, training data, such as training data satisfying the first criterion. The obtaining of training data may comprise to select training samples from a database of training samples. The first criterion may be seen as a performance criterion, such as a criterion indicative of an estimated detection performance of the first detection model when applied by an electronic device of the first cluster. In other words, the first criterion may be seen as a capability criterion, such as a criterion indicative of a capability of detection of one or more electronic devices of the first cluster when applying the first detection model. In other words, the electronic device 300A, 300B may be configured to determine whether training data and/or detection elements satisfy the first criterion.

In one or more example electronic devices, the first criterion is based on a first threshold and/or one or more detection elements. For example, the training data and/or detection elements satisfy the first criterion when the training data and/or detection elements are above the first threshold.

In one or more example electronic devices, the obtaining of the training data comprises to determine one or more detection elements having an estimated performance in the first detection model that satisfies the first criterion. For example, the obtaining of the training data comprises to determine one or more keywords and/or faces to be detected having an estimated performance in the first detection model, applied by one or more electronic devices of the first cluster, that satisfy the first criterion. In other words, the obtaining of the training data comprises to determine one or more keywords and/or faces to be detected that may guarantee a certain detection model performance for the one or more electronic devices of the first cluster. In one or more example electronic devices, the obtaining of the training data may comprise to prioritize one or more detection elements. In other words, the obtaining of the training data may comprise to prioritize certain keywords and/or face identifications according to prioritized commands and/or subjects.

In one or more example electronic devices, the obtaining of the training data comprises to update based on the one or more detection elements, such as based on the training data, the first detection model. For example, the updating of the detection model may comprise to update, such as populate, the first detection model with one or more keywords and/or faces to be detected having an estimated performance in the first detection model, applied by one or more electronic devices of the first cluster, that satisfy the first criterion. In other words, the updating of the first detection model comprises to update, such as populate, the first detection models with one or more keywords and/or faces to be detected that may guarantee a certain detection model performance for the one or more electronic devices of the first cluster. In one or more example electronic devices, the updating of the first detection model may comprise to prioritize one or more detection elements. In other words, the updating of the first detection model may comprise to prioritize certain keywords and/or face identifications according to prioritized commands and/or subjects. In other words, the electronic device 300A, 300B may be configured to determine the first configuration parameter based on the training data to provide the first detection model.

In one or more example electronic devices, the electronic device 300A, 300B is configured to transmit the training data to the one or more electronic devices of the first cluster. In other words, the electronic device 300A, 300B may be configured to distribute (such as assign) the training data to one or more electronic devices of the first cluster, such as to each of the one or more electronic devices of the first cluster.

In one or more example electronic devices, the electronic device is configured to transmit the one or more detection elements satisfying the first criterion to the one or more electronic devices of the first cluster.

In one or more example electronic devices, the electronic device 300A, 300B is configured to obtain updated training data based on the second configuration parameter. The obtaining of the updated training data may comprise to determine, select, generate, retrieve, and/or obtain, updated training data, such as updated training data satisfying a third criterion. The obtaining of updated training data may comprise to select training samples from a database of training samples. The third criterion may be seen as a performance criterion, such as a criterion indicative of a detection performance of the first detection model when applied by an electronic device of the second cluster. In other words, the third criterion may be seen as a performance criterion, such as a criterion indicative of a performance of detection of one or more electronic devices of the second cluster when applying the first detection model. In other words, the electronic device 300A, 300B may be configured to determine whether updated training data and/or updated detection elements satisfy the third criterion. The obtaining of updated training data may comprise to obtain one or more updated detection elements based on the second configuration parameter.

In one or more example electronic devices, the electronic device 300A, 300B is configured to update the first detection model based on the updated training data to provide the updated first detection model. In other words, the electronic device 300A, 300B may be configured to determine the second configuration parameter based on the updated training data to provide the updated first detection model. For example, the updating of the first detection model, such as training, improving, may comprise to update, such as populate, the first detection model with one or more keywords and/or faces to be detected having a performance in the first detection model, applied by one or more electronic devices of the second cluster, that satisfy the third criterion. In other words, the updating of the first detection model comprises to update, such as populate, the first detection models with one or more keywords and/or faces to be detected that may guarantee a certain detection model performance for the one or more electronic devices of the second cluster. In one or more example electronic devices, the updating of the first detection model may comprise to prioritize one or more detection elements. In other words, the updating of the first detection model may comprise to prioritize certain keywords and/or face identifications according to prioritized commands and/or subjects.

In one or more example electronic devices, the electronic device 300A, 300B is configured to determine whether a change in the first data occurred. The determination of whether a change in the first data has occurred may comprise to determine whether a change that may affect the clustering of the electronic devices, such as the first cluster and/or the second cluster, has occurred. For example, the electronic device 300A, 300B may be configured to listen for changes that may affect electronic device clustering. A change in the first data may be seen as a change in electronic device identifiers (such as a change in the plurality of electronic devices, such as IoT devices in communication with the electronic device) and/or a change in capability parameters of the plurality of electronic devices. For example, a change in the first data may comprise one or more of: a change in a positioning parameter of an electronic device, a change in a contextual location parameter of an electronic device, a change in an audial context parameter of an electronic device, a change in a video context parameter of an electronic device, a change in a radio context parameter of an electronic device, and a change in a connectivity parameter of an electronic device. The clustering of electronic devices may thereby be performed dynamically, based on a change in the first data.

For example, a change in the first data may comprise one or more of: an onboarding and/or an off boarding of an electronic device (for example based on device runtime) and a change in coordinates of an electronic device.

In one or more example electronic devices, the electronic device 300A, 300B is configured to, in accordance with the determination of a change, determine one or more first clusters of electronic devices and/or one or more second cluster of electronic devices. In other words, the electronic device 300A, 300B is configured to, in accordance with the determination of a change, reiterate the determination of one or more first clusters of electronic devices and/or one or more second cluster of electronic devices. In one or more example electronic devices, the electronic device 300A, 300B is configured to, in accordance with the determination of a change, reiterate any one or more of: obtaining first data, determining a first cluster, determining a first configuration parameter, transmitting the first detection model, determining a second cluster, obtaining detection data, determining a performance parameter, determining a second configuration parameter, and transmitting an updated first detection model.

In one or more example electronic devices, the electronic device 300A, 300B is optionally configured to obtain further first data, determine further clusters, such as further first clusters and/or second clusters, determine further configuration parameters, obtain further detection data, and/or update further detection models for further electronic devices (such as IoT devices).

The electronic device 300A, 300B, such as processor circuitry 302A, 302B, is optionally configured to perform any of the operations disclosed in FIGS. 2A-2C (such as any one or more of S106A, S116A, S116B, S117, S118, S118A, S118B, S118C, S119, S120, S122, S124, S128, S129, S130). The operations of the electronic device 300A, 300B may be embodied in the form of executable logic routines (for example, lines of code, software programs, etc.) that are stored on a non-transitory computer readable medium (for example, memory circuitry 301A, 301B) and are executed by processor circuitry 302A, 302B).

Furthermore, the operations of the electronic device 300A, 300B may be considered a method that the electronic device 300A, 300B is configured to carry out. Also, while the described functions and operations may be implemented in software, such functionality may also be carried out via dedicated hardware or firmware, or some combination of hardware, firmware and/or software.

Memory circuitry 301A, 301B may be one or more of a buffer, a flash memory, a hard drive, a removable media, a volatile memory, a non-volatile memory, a random access memory (RAM), or other suitable device. In a typical arrangement, memory circuitry 301A, 301B may include a non-volatile memory for long term data storage and a volatile memory that functions as system memory for processor circuitry 302A, 302B. Memory circuitry 301A, 301B may exchange data with processor circuitry 302A, 302B over a data bus. Control lines and an address bus between memory circuitry 301A, 301B and processor circuitry 302A, 302B also may be present (not shown in FIG. 1). Memory circuitry 301A, 301B is considered a non-transitory computer readable medium.

Memory circuitry 301A, 301B may be configured to store electronic device identifiers, a plurality of capability parameters, a first detection model, an updated detection model, a first cluster, a second cluster, a first configuration parameter, a second configuration parameter, a proximity parameter in a part of the memory.

FIGS. 2A-2C show a flow diagram of an example method 100, performed by an electronic device according to the disclosure. The method may be performed for adapting a detection model. In other words, the method 100 may be configured for supporting collaboration between electronic devices (such as IoT devices), such as detection collaboration between electronic devices (such as IoT devices).

The electronic device is the electronic device disclosed herein, such as the electronic device 300A, 300B of FIG. 1.

The method 100 comprises obtaining S102 first data comprising a plurality of electronic device identifiers and a plurality of capability parameters comprising for each electronic device a capability parameter indicative of a capability of a corresponding electronic device of the plurality of electronic devices. The obtaining S102 of first data may comprise obtaining first data from a plurality of electronic devices, such as a plurality of IoT devices in communication with the electronic device. The obtaining S102, such as from a plurality of electronic devices, first data may for example comprise retrieving, receiving, determining, and/or selecting first data, such as electronic device identifiers and/or capability parameters. The plurality of electronic devices (such as IoT devices) may for example comprise one or more of: an optical device, such as a video and/or image detection device, and a sound detection device. The plurality of electronic devices (such as IoT devices) may for example comprise a plurality of cameras and/or microphones in a building, such as in a plurality of rooms of a building. The plurality of electronic devices (such as IoT devices) may for example comprise one or more of: an image sensor, a capturing device, a wall-mounted camera, a web-cam, a closed circuit television, CCTV, an infrared sensor, a light sensor, and an optical movement sensor. The plurality of electronic devices may for example be used in the context of building management, such as smart buildings, for performing detection tasks.

The method comprises determining S104, based on the plurality of capability parameters, a first cluster of one or more electronic devices. In one or more example methods, the method 100 comprises determining, based on the plurality of capability parameters (such as some of the plurality of capability parameters) and/or the plurality of electronic device identifiers (such as some of the plurality of electronic device identifiers), a first cluster of one or more electronic devices. In one or more example methods, the method 100 comprises determining, based on the plurality of capability parameters and/or the plurality of electronic device identifiers, a plurality of clusters, such as a plurality of first clusters, for example including a first primary cluster, a first secondary cluster, and/or a first tertiary cluster.

The method comprises determining S106, based on the capability parameter of each (such as some of) of the one or more electronic devices of the first cluster, a first configuration parameter for obtaining a first detection model to be applied by one or more electronic devices of the first cluster. The determination S106 of the first configuration parameter may comprise determining a configuration for obtaining the first detection model to be applied by one or more electronic devices of the first cluster. In other words, the first detection model may be obtained, such as determined, selected, retrieved, and/or received based on the first configuration parameter. In one or more example methods, the method 100 comprises determining the first configuration parameter based on one or more of: a memory capability parameter, a processing capability parameter, a hardware capability parameter, a software capability parameter, and a battery capability parameter. In other words, the determination S106 of the first configuration parameter comprises to determine one or more parameters of a detection model that the electronic devices of the first cluster may be able to (such as estimated to) run and/or execute based on the capability parameters of the electronic devices of the first cluster.

The method comprises transmitting S108 the first detection model to the one or more electronic devices of the first cluster. In other words, the method 100 may comprises distributing the first detection model to the one or more electronic devices of the first cluster.

The method comprises determining S110, based on a proximity parameter, a second cluster of electronic devices. The determination S110 of the second cluster of electronic devices may comprise determining, selecting, retrieving, and/or obtaining, the electronic devices of the first cluster to be in the second cluster. In one or more example methods, each electronic device, such as each electronic device of the first cluster, may comprise a proximity parameter. In other words, the first data may comprise one or more proximity parameters, such as a plurality of proximity parameters. In one or more example methods, the method 100 comprises determining, based on the one or more proximity parameters of the one or more electronic devices of the first cluster, the second cluster of electronic devices.

The method comprises obtaining S112, from the second cluster, detection data obtained by one or more electronic devices of the second cluster by applying the first detection model.

The method comprises determining S114, based on the detection data, a performance parameter of the first detection model when running on an electronic device of the second cluster. The determination S114 of a performance parameter may comprise determining a confidence score indicating a confidence and/or a probability that a detection, such as an output of a detection model, is correct. The determination S114 of a performance parameter may comprise determining a performance indicator.

The method comprises determining S116, based on the performance parameter, a second configuration parameter for the first detection model to provide an updated first detection model. The determination S116 of the second configuration parameter may comprise determining a configuration for obtaining the updated first detection model to be applied by one or more electronic devices of the second cluster. In other words, the updated first detection model may be obtained, such as determined, selected, retrieved, and/or received based on the second configuration parameter. In one or more example methods, the method 100 comprises determining the second configuration parameter based on the performance parameter. In other words, the determination S116 of the second configuration parameter comprises to determine one or more parameters of a detection model that the electronic devices of the second cluster may be able to (such as estimated to) run and/or execute based on the performance parameter of the electronic devices of the second cluster be applying the first detection model.

The method comprises transmitting S126 the updated first detection model to one or more electronic devices of the second cluster. In one or more example methods, the method 100 comprises distributing the updated first detection model to one or more electronic devices of the second cluster, such as to each of the one or more electronic devices of the second cluster.

In one or more examples methods, the capability parameter comprises one or more of: a memory capability parameter, a processing capability parameter, a hardware capability parameter, a software capability parameter, and a battery capability parameter.

In one or more examples methods, determining S106 the first configuration parameter of the first detection model comprises determining S106A one or more of: a model size, a model architecture, and a complexity level of the first detection model.

In one or more examples methods, the proximity parameter comprises one or more of: a positioning parameter, a contextual location parameter, an audial context parameter, a video context parameter, a radio context parameter, and a connectivity parameter.

In one or more examples methods, the first detection model is configured to detect one or more of: a keyword, an item, an object, and a face. In other words, the method 100 may comprise detecting one or more of: a keyword, an item, an object, and a face.

In one or more examples methods, the detection data comprises one or more of: keyword detection data, item detection data, object detection data, and face detection data.

In one or more examples methods, the performance parameter is indicative of a performance of the first detection model when performing a detection.

In one or more examples methods, determining S116 the second configuration parameter comprises determining S116A whether the performance parameter satisfies a second criterion. In other words, in accordance with the performance parameter satisfying the second criterion, the method 100 may comprise determining the second configuration parameter comprising an overlap parameter. For example, the method 100 may comprise determining, when the performance parameter is satisfied, that the first detection model has under-capacity usage when applied by one or more electronic devices of the second cluster. For example, the method 100 may comprise determining, when the performance parameter is satisfied, that the first detection model has over-capacity usage when applied by one or more electronic devices of the second cluster.

In one or more examples methods, determining S116 the second configuration parameter comprises, when the performance parameter satisfies the second criterion, determining S116B the second configuration parameter comprising an overlap parameter, wherein the overlap parameter is configured to prevent overlap of detection elements between the one or more electronic devices of the second cluster and/or to prioritize a first detection type.

In one or more examples methods, determining S116 the second configuration parameter comprises, when the performance parameter does not satisfy the second criterion, determining S117 the second configuration parameter comprising the overlap parameter, wherein the overlap parameter is configured to allow overlap of detection between the one or more electronic devices of the second cluster and/or to prioritize a second detection type.

In one or more examples methods, the method comprises obtaining S118 training data for the first detection model, based on a first criterion. In other words, the method 100 may comprise determining S118A whether training data and/or detection elements satisfy the first criterion.

In one or more examples methods, obtaining S118 the training data comprises determining S118B one or more detection elements having an estimated performance in the first detection model that satisfies the first criterion. In one or more examples methods, obtaining S118 the training data comprises updating S118C, based on the one or more detection elements, the first detection model. When it is determined that training data does not satisfy the first criterion, the method 100 comprises refraining S119 from determining detection elements.

In one or more examples methods, the method 100 comprises transmitting S120 the training data to the one or more electronic devices of the first cluster.

In one or more examples methods, the method 100 comprises obtaining S122 updated training data based on the second configuration parameter. In one or more examples methods, the method comprises updating S124 the first detection model based on the updated training data to provide the updated first detection model.

In one or more examples methods, the method 100 comprises determining S128 whether a change in the first data occurred. In one or more examples methods, the method 100 comprises, in accordance with the determination of a change, determining S130 one or more first clusters of electronic devices and/or one or more second cluster of electronic devices. When it is determined that no change has occurred, the method 100 comprises refraining S129 from determining one or more first clusters of electronic devices and/or one or more second cluster of electronic devices.

In one or more examples methods, the first criterion is based on a first threshold and/or one or more detection elements.

In one or more examples methods, the second criterion is based on a second threshold.

In one or more example methods, the method 100 may comprise obtaining further first data, determining further clusters, such as further first clusters and/or second clusters, determining further configuration parameters, obtaining further detection data, and/or updating further detection models for further electronic devices (such as IoT devices).

In one or more examples methods, the electronic device is a server device.

Examples of methods and products (electronic device, server device) according to the disclosure are set out in the following items:

Item 1. An electronic device (300A, 300B) comprising:
- memory circuitry (301A, 301B);
- processor circuitry (302A, 302B);
- and interface circuitry (303A, 303B);

wherein the electronic device (300A, 300B) is configured to:
- obtain first data comprising a plurality of electronic device identifiers and a plurality of capability parameters comprising for each electronic device a capability parameter indicative of a capability of a corresponding electronic device of the plurality of electronic devices;
- determine, based on the plurality of capability parameters, a first cluster of one or more electronic devices;
- determine, based on the capability parameter of each of the one or more electronic devices of the first cluster, a first configuration parameter for obtaining a first detection model to be applied by one or more electronic devices of the first cluster;
- transmit the first detection model to the one or more electronic devices of the first cluster;
- determine, based on a proximity parameter, a second cluster of electronic devices;

obtain, from the second cluster, detection data obtained by one or more electronic devices of the second cluster by applying the first detection model;

determine, based on the detection data, a performance parameter of the first detection model when running on an electronic device of the second cluster;

determine, based on the performance parameter, a second configuration parameter for the first detection model to provide an updated first detection model; and transmit the updated first detection model to one or more electronic devices of the second cluster.

Item 2. The electronic device according to item 1, wherein the capability parameter comprises one or more of: a memory capability parameter, a processing capability parameter, a hardware capability parameter, a software capability parameter, and a battery capability parameter.

Item 3. The electronic device according to any of the previous items, wherein the determination of the first configuration parameter of the first detection model comprises to determine one or more of: a model size, a model architecture, and a complexity level of the first detection model.

Item 4. The electronic device according to any of the previous items, wherein the proximity parameter comprises one or more of: a positioning parameter, a contextual location parameter, an audial context parameter, a video context parameter, a radio context parameter, and a connectivity parameter.

Item 5. The electronic device according to any of the previous items, wherein the first detection model is configured to detect one or more of: a keyword, an item, an object, and a face.

Item 6. The electronic device according to any of the previous items, wherein the detection data comprises one or more of: keyword detection data, item detection data, object detection data, and face detection data.

Item 7. The electronic device according to any of the previous items, wherein the performance parameter is indicative of a performance of the first detection model when performing a detection.

Item 8. The electronic device according to any of the previous items, wherein the determination of the second configuration parameter comprises to:

determine whether the performance parameter satisfies a second criterion;

wherein the electronic device is configured to, when the performance parameter satisfies the second criterion:

determine the second configuration parameter comprising an overlap parameter, wherein the overlap parameter is configured to prevent overlap of detection elements between the one or more electronic devices of the second cluster and/or to prioritize a first detection type.

Item 9. The electronic device according to item 8, wherein the electronic device (300A, 300B) is configured to, when the performance parameter does not satisfy the second criterion:

determine the second configuration parameter comprising the overlap parameter, wherein the overlap parameter is configured to allow overlap of detection between the one or more electronic devices of the second cluster and/or to prioritize a second detection type.

Item 10. The electronic device according to any of the previous items, wherein the electronic device (300A, 300B) is configured to:

obtain training data for the first detection model, based on a first criterion.

Item 11. The electronic device according to item 10, wherein the obtaining of the training data comprises:

determining one or more detection elements having an estimated performance in the first detection model that satisfies the first criterion; and updating based on the one or more detection elements, the first detection model.

Item 12. The electronic device according to any of items 10-11, wherein the electronic device (300A, 300B) is configured to transmit the training data to the one or more electronic devices of the first cluster.

Item 13. The electronic device according to any of items 10-12, wherein the electronic device (300A, 300B) is configured to:

obtain updated training data based on the second configuration parameter; and update the first detection model based on the updated training data to provide the updated first detection model.

Item 14. The electronic device according to any of the previous items, wherein the electronic device (300A, 300B) is configured to:

determine whether a change in the first data occurred; and in accordance with the determination of a change, determine one or more first clusters of electronic devices and/or one or more second cluster of electronic devices.

Item 15. The electronic device according to any of items 10-14, wherein the first criterion is based on a first threshold and/or one or more detection elements.

Item 16. The electronic device according to any of the previous items, wherein the second criterion is based on a second threshold.

Item 17. The electronic device according to any of the previous items, wherein the electronic device is a server device.

Item 18. A method (100), performed by an electronic device, the method comprising:

obtaining (S102) first data comprising a plurality of electronic device identifiers and a plurality of capability parameters comprising for each electronic device a capability parameter indicative of a capability of a corresponding electronic device of the plurality of electronic devices;

determining (S104), based on the plurality of capability parameters, a first cluster of one or more electronic devices;

determining (S106), based on the capability parameter of each of the one or more electronic devices of the first cluster, a first configuration parameter for obtaining a first detection model to be applied by one or more electronic devices of the first cluster;

transmitting (S108) the first detection model to the one or more electronic devices of the first cluster;

determining (S110), based on a proximity parameter, a second cluster of electronic devices;

obtaining (S112), from the second cluster, detection data obtained by one or more electronic devices of the second cluster by applying the first detection model;

determining (S114), based on the detection data, a performance parameter of the first detection model when running on an electronic device of the second cluster;

determining (S116), based on the performance parameter, a second configuration parameter for the first detection model to provide an updated first detection model; and transmitting (S126) the updated first detection model to one or more electronic devices of the second cluster.

Item 19. The method according to item 18, wherein the capability parameter comprises one or more of: a memory capability parameter, a processing capability parameter, a hardware capability parameter, a software capability parameter, and a battery capability parameter.

Item 20. The method according to any of items 18 to 19, wherein determining (S106) the first configuration parameter of the first detection model comprises:

determining (S106A) one or more of: a model size, a model architecture, and a complexity level of the first detection model.

Item 21. The method according to any of items 18 to 20, wherein the proximity parameter comprises one or more of: a positioning parameter, a contextual location parameter, an audial context parameter, a video context parameter, a radio context parameter, and a connectivity parameter.

Item 22. The method according to any of items 18 to 21, wherein the first detection model is configured to detect one or more of: a keyword, an item, an object, and a face.

Item 23. The method according to any of items 18 to 22, wherein the detection data comprises one or more of: keyword detection data, item detection data, object detection data, and face detection data.

Item 24. The method according to any of items 18 to 23, wherein the performance parameter is indicative of a performance of the first detection model when performing a detection.

Item 25. The method according to any of items 18 to 24, wherein determining (S116) the second configuration parameter comprises:

determining (S116A) whether the performance parameter satisfies a second criterion;

wherein, when the performance parameter satisfies the second criterion, the method comprises:

determining (S116B) the second configuration parameter comprising an overlap parameter, wherein the overlap parameter is configured to prevent overlap of detection elements between the one or more electronic devices of the second cluster and/or to prioritize a first detection type.

Item 26. The method according to item 25, wherein, when the performance parameter does not satisfy the second criterion, the method comprises:

determining (S117) the second configuration parameter comprising the overlap parameter, wherein the overlap parameter is configured to allow overlap of detection between the one or more electronic devices of the second cluster and/or to prioritize a second detection type.

Item 27. The method according to any of items 18 to 26, the method comprising:

obtaining (S118) training data for the first detection model, based on a first criterion.

Item 28. The method according to item 27, wherein obtaining (S118) the training data comprises:

determining (S118A) one or more detection elements having an estimated performance in the first detection model that satisfies the first criterion; and updating (S118B), based on the one or more detection elements, the first detection model.

Item 29. The method according to any of items 27 to 28, wherein method comprises:

transmitting (S120) the training data to the one or more electronic devices of the first cluster.

Item 30. The method according to any of items 27 to 29, wherein method comprises:

obtaining (S122) updated training data based on the second configuration parameter; and updating (S124) the first detection model based on the updated training data to provide the updated first detection model.

Item 31. The method according to any of items 18 to 30, wherein the method comprises:

determining (S128) whether a change in the first data occurred; and in accordance with the determination of a change, determining (S130) one or more first clusters of electronic devices and/or one or more second cluster of electronic devices.

Item 32. The method according to any of items 27 to 31, wherein the first criterion is based on a first threshold and/or one or more detection elements.

Item 33. The method according to any of items 18 to 32, wherein the second criterion is based on a second threshold.

Item 34. The method according to any of items 18 to 33, wherein the electronic device is a server device.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering. Furthermore, the labelling of a first element does not imply the presence of a second element and vice versa.

It may be appreciated that the figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the scope of the claims, and it will be apparent to those skilled in the art that various changes and modifications may be made without departing from the scope of the claims. The specification and drawings are, accordingly, to be regarded in an illustrative rather than restrictive sense. The claims is intended to cover all alternatives, modifications, and equivalents.

What is claimed is:

1. An electronic device comprising:

memory circuitry;

processor circuitry;

and interface circuitry;

wherein the electronic device is configured to:

obtain first data comprising a plurality of electronic device identifiers for respective electronic devices and a plurality of capability parameters comprising, for each of the electronic devices, a capability parameter indicative of a physical hardware resource capability in terms of at least one of a memory capability, a processing capability, a software execution capability, or a battery capability of the electronic device;

determine, based on the plurality of capability parameters, a first cluster electronic devices;

determine, based on the plurality of capability parameters of the electronic devices of the first cluster, a first configuration parameter specifying at least one of a model size, a model architecture, or a complexity level of a first detection model to be applied by one or more electronic devices of the first cluster;

transmit, via the interface circuitry and over a wireless communication network, the first detection model to the one or more electronic devices of the first cluster;

determine, based on a proximity parameter, a second cluster of electronic devices;

obtain, from the second cluster, detection data obtained by the electronic devices of the second cluster by applying the first detection model;

determine, based on the detection data, a performance parameter of the first detection model run by one of the electronic devices of the second cluster;

determine, based on the performance parameter, a second configuration parameter for the first detection model upon which an updated first detection model is based; and transmit the updated first detection model to the electronic devices of the second cluster.

2. The electronic device according to claim 1, wherein the proximity parameter comprises one or more of: a positioning parameter, a contextual location parameter, an audial context parameter, a video context parameter, a radio context parameter, and a connectivity parameter.

3. The electronic device according to claim 1, wherein the first detection model is configured to detect one or more of: a keyword, an item, an object, and a face.

4. The electronic device according claim 1, wherein the detection data comprises one or more of: keyword detection data, item detection data, object detection data, and face detection data.

5. The electronic device according to claim 1, wherein the performance parameter is indicative of a performance of the first detection model when performing a detection.

6. The electronic device according to claim 1, wherein the determination of the second configuration parameter comprises to:

determine whether the performance parameter satisfies a second criterion;

wherein the electronic device is configured to, when the performance parameter satisfies the second criterion:

determine the second configuration parameter comprising an overlap parameter, wherein the overlap parameter is configured to prevent overlap of detection elements between the one or more electronic devices of the second cluster and/or to prioritize a first detection type.

7. The electronic device according to claim 6, wherein the electronic device is configured to, when the performance parameter does not satisfy the second criterion:

determine the second configuration parameter comprising the overlap parameter, wherein the overlap parameter is configured to allow overlap of detection between the one or more electronic devices of the second cluster and/or to prioritize a second detection type.

8. The electronic device according to claim 1, wherein the electronic device is configured to:

obtain training data for the first detection model, based on a first criterion.

9. The electronic device according to claim 8, wherein the obtaining of the training data comprises:

determining one or more detection elements having an estimated performance in the first detection model that satisfies the first criterion; and updating based on the one or more detection elements, the first detection model.

10. The electronic device according to claim 8, wherein the electronic device is configured to transmit the training data to the one or more electronic devices of the first cluster.

11. The electronic device according to claim 8, wherein the electronic device is configured to:

obtain updated training data based on the second configuration parameter; and update the first detection model based on the updated training data to provide the updated first detection model.

12. The electronic device according to claim 8, wherein the first criterion is based on a first threshold and/or one or more detection elements.

13. The electronic device according to claim 1, wherein the electronic device is configured to:

determine whether a change in the first data occurred; and in accordance with the determination of a change, determine one or more first clusters of electronic devices and/or one or more second cluster of electronic devices.

14. The electronic device according to claim 1, wherein the second criterion is based on a second threshold.

15. The electronic device according to claim 1, wherein the electronic device is a server device.

16. A method, performed by an electronic device, the method comprising:

obtaining first data comprising a plurality of electronic device identifiers for respective electronic devices and a plurality of capability parameters comprising, for each of the electronic devices, a capability parameter indicative of a physical hardware resource capability in terms of at least one of a memory capability, a processing capability, a software execution capability, or a battery capability of the electronic device;

determining, based on the plurality of capability parameters, a first cluster of electronic devices;

determining, based on the plurality of capability parameters of the electronic devices of the first cluster, a first configuration parameter specifying at least one of a model size, a model architecture, or a complexity level of the first detection model a first detection model to be applied by one or more electronic devices of the first cluster;

transmitting, via the interface circuitry and over a wireless communication network, the first detection model to the one or more electronic devices of the first cluster;

determining, based on a proximity parameter, a second cluster of electronic devices;

obtaining, from the second cluster, detection data obtained by the electronic devices of the second cluster by applying the first detection model;

determining, based on the detection data, a performance parameter of the first detection model run by one of the electronic devices of the second cluster;

determining, based on the performance parameter, a second configuration parameter for the first detection model upon which an updated first detection model is based; and transmitting the updated first detection model to the electronic devices of the second cluster.

* * * * *